United States Patent
Combe et al.

(10) Patent No.: US 10,605,475 B2
(45) Date of Patent: Mar. 31, 2020

(54) ENVIRONMENTAL CONTROL CONFIGURATION

(71) Applicant: CENTRICA HIVE LIMITED, Windsor, Berkshire (GB)

(72) Inventors: Nicola Combe, London (GB); Nicolas Mouazan, Windsor (GB); John Gutch, Grays (GB)

(73) Assignee: Centrica Hive Limited, Windsor, Berkshire (GB)

( * ) Notice: Subject to any disclaimer, the term of this patent is extended or adjusted under 35 U.S.C. 154(b) by 56 days.

(21) Appl. No.: 15/891,812

(22) Filed: Feb. 8, 2018

(65) Prior Publication Data

US 2018/0231268 A1 Aug. 16, 2018

(30) Foreign Application Priority Data

Feb. 10, 2017 (GB) .................................. 1702231.0

(51) Int. Cl.
*F24F 11/30* (2018.01)
*F24F 11/58* (2018.01)
(Continued)

(52) U.S. Cl.
CPC .............. *F24F 11/63* (2018.01); *F24F 11/58* (2018.01); *G05B 15/02* (2013.01); *F24F 11/52* (2018.01); *G05B 2219/2642* (2013.01)

(58) Field of Classification Search
CPC . F24F 11/30; F24F 11/58; F24F 11/63; G05B 15/02

See application file for complete search history.

(56) References Cited

U.S. PATENT DOCUMENTS 8,620,841 B1 * 12/2013 Filson ................. H04L 12/1895
706/12
8,659,302 B1 * 2/2014 Warren ................. G05D 23/19
324/550
(Continued)

FOREIGN PATENT DOCUMENTS

WO WO-2018183490 A1 * 10/2018 .............. F24F 11/30

OTHER PUBLICATIONS

United Kingdom, UK Search Report for GB1702231.0, date of search Aug. 21, 2017, South Wales.

*Primary Examiner* — Ronald D Hartman, Jr.
(74) *Attorney, Agent, or Firm* — Tucker Ellis LLP; Michael G. Craig

(57) ABSTRACT

An environmental controller arranged to control an environmental control system and a method of setting the operational configuration of such an environmental controller are described. The method comprises: displaying a user query from a series of user queries on a display of a user interface on the environmental controller, receiving in response to the at least one user query, a user input at the user interface, the user input relating to at least one of the one or more appliances intended to be controlled by the environmental controller, determining an expected connection configuration for physical connection terminals on the environmental controller based on the user input, and then detecting by the controller connections at the plurality of physical connection terminals; and validating the user input by comparing the detected connections to the physical connection terminals with the expected connection configuration.

20 Claims, 10 Drawing Sheets

(51) Int. Cl.
    *F24F 11/63*         (2018.01)
    *G05B 15/02*         (2006.01)
    *F24F 11/52*         (2018.01)

(56) References Cited

U.S. PATENT DOCUMENTS

| | | | |
|---|---|---|---|
| 9,092,039 | B2 | 7/2015 | Fadell et al. |
| 2006/0196200 | A1* | 9/2006 | Harrod .................... F25B 13/00 62/160 |
| 2012/0130679 | A1* | 5/2012 | Fadell ................ G05D 23/1902 702/183 |
| 2012/0206679 | A1* | 8/2012 | Ohyama ........... G02F 1/133555 349/113 |
| 2012/0246590 | A1 | 9/2012 | D'Souza et al. |
| 2013/0204440 | A1* | 8/2013 | Fadell ..................... F24F 11/30 700/276 |
| 2013/0218351 | A1* | 8/2013 | Warren .............. G05D 23/1902 700/278 |
| 2015/0127173 | A1* | 5/2015 | Chinnaiyan .............. F24F 11/30 700/276 |
| 2015/0144705 | A1* | 5/2015 | Thiruvengada .......... F24F 11/30 236/1 C |
| 2015/0148963 | A1* | 5/2015 | Klein ..................... F24F 11/30 700/276 |
| 2015/0308705 | A1* | 10/2015 | Sloo ....................... G05B 15/02 700/276 |
| 2016/0025366 | A1* | 1/2016 | Snow ..................... G05B 15/02 700/276 |
| 2017/0237576 | A1* | 8/2017 | Gerszewski .......... H04L 12/281 700/276 |
| 2018/0283716 | A1* | 10/2018 | Ribbich .................. F24F 11/30 |

* cited by examiner

ENVIRONMENTAL CONTROL CONFIGURATION

CROSS-REFERENCE TO RELATED APPLICATIONS

This application claims priority to Great Britain Patent Application Serial No. 1702231.0 entitled ENVIRONMENTAL CONTROL CONFIGURATION, filed Feb. 10, 2017, which is incorporated herein by reference.

BACKGROUND

Environmental control systems are available which can control environmental parameters. An example environmental control system is a heating ventilation and air conditioning (HVAC) system, which may comprise one or more devices which are operable to heat, ventilate and/or air condition a premises. In some cases, HVAC systems or environmental control systems may be operable to provide only heating, ventilation air conditioning or humidity control, rather than a combination. Environmental control systems may comprise environmental control devices or appliances for controlling the environmental parameters, e.g. boilers, radiators, central heating systems, air conditioning units or dehumidifiers and/or humidifiers.

Thermostats, or environmental controllers, can be used to provide control commands to environmental appliances in order to influence or change environmental parameters or characteristics, such as the temperature or humidity. It is possible to provide control commands for environmental control systems by programming a schedule into a thermostat at a premises, for example by pressing buttons or interacting with a touch screen on the thermostat.

Thermostats may be connected to environmental appliances by wired connections and/or they may be connected wirelessly so that it is possible to send commands to the appliances. Some of these appliances may be able to influence an environmental parameter in more than one direction, for example a heat pump may be available both for providing cooling and heating (when operating in different modes), or a fan may be used in order to optimise both heating and cooling, as appropriate. Additionally or alternatively there may be more than one appliance which can influence an environmental parameter in the same manner, for example a gas furnace or boiler and a heat pump may both be available for increasing air temperature.

SUMMARY

There is described herein: a method of setting the operational configuration of an environmental controller or thermostat arranged to control an environmental control system comprising one or more appliances for influencing one or more environmental parameters at a premises, the method comprising the steps of: displaying at least one user query from a series of user queries on a display of a user interface on the environmental controller; receiving, in response to the at least one user query, at least one user input at the user interface, the at least one user input relating to at least one of the one or more appliances intended to be controlled by the environmental controller; determining an expected connection configuration for a plurality of physical connection terminals on the environmental controller based on the at least one user input; following determining the expected connection configuration, detecting by the controller connections at the plurality of physical connection terminals; and validating the at least one user input by comparing the detected connections to the plurality of physical connection terminals with the expected connection configuration.

By presenting the user with one or more queries and then validating connections to the environmental controller based on the answers to the queries, anomalies such as incorrectly connected wires or incorrect user inputs may be identified more easily and accurately than in prior systems. It has previously been suggested to confirm the types of appliances intended to be connected to an environmental controller, or thermostat, by presenting a user with queries which are based on physical connections detected at the environmental controller. However, such a method can lead to the problem of confirmation bias, whereby a user who has misconnected the connections to the environmental controller may simply confirm what has been inferred by the system and then presented in the queries.

The appliances may comprise environmental control appliances for influencing an environmental parameter, or characteristic, (e.g. air temperature, pressure, humidity) within the premises. Such appliances may be boilers, heaters, humidifiers, dehumidifiers, heat pumps, air conditioning units, furnaces, air handlers etc.

The expected connection configuration may comprise various combinations for each terminal being expected (a) to have a connection, (b) to not have a connection, and (c) optionally to have a connection (e.g. a connection is allowed but not required). For example, the expected connection configuration may comprise assigning statuses such as "definitely", "definitely not" and/or "optionally" to the expected connection at each terminal.

Preferably the method is performed at the environmental controller.

The user inputs may relate to appliances which the user intends to connect to the environmental controller (in which case the user may be prompted, e.g. by a message displayed on the user interface, to connect the appliances to the controller after the step of receiving the at least one user input and before the step of detecting connections). In alternative embodiments, the user inputs may relate to appliances which the user believes they have already connected to the environmental controller.

Preferably, the method further comprises the step of: upon determining a divergence between the detected connections to the plurality of physical connection terminals and the expected connection configuration, displaying an error message on the user interface.

By basing an error message on a divergence between detected and expected connections it may be possible to identify that a user has entered incorrect information relating to appliances to be controlled by the controller or that the user has incorrectly attached the connectors. Thus it is possible to provide tailored error messages which may be more specific and more helpful to the user than conventional error messages.

Preferably, the method further comprises: upon determining a divergence between the detected connections to the plurality of physical connection terminals and the expected connection configuration, disabling one or more control functions of the controller.

By disabling a control function when it has been determined that there is a potential error in connections, it is possible to ensure control settings are not sent to an appliance incorrectly, which could lead to sub-optimal control of environmental parameters, or even cause damage to appliances. In some cases, disabling a control function may comprise disabling the ability of the environmental controller to send any control messages to appliances from all of the connection terminals, whilst in other cases disabling a control function may comprise disabling the ability to send control messages only from the connection terminals for which the detected connections diverge from the expected connections. The determination of whether controls to some or all terminals are disabled may be made based on the total number of connections terminals for which the detected connections diverge or differ from the expected connections and/or the types of physical connection terminals for which the expected and detected connections differ. For example, it may be more dangerous to send some types of commands than others.

In other embodiments, disabling one or more control functions may comprise disabling certain commands, whilst still allowing other commands to be sent from the connection terminals (potentially even at those connection terminals where the expected and detected connections diverge).

In some embodiments, the method further comprises: upon determining that detected connections to the plurality of physical connection terminals match the expected connection configuration, configuring an environmental control setting of the environmental controller.

By setting or adjusting control functions based on detected and expected connections to the environmental controller it is possible to provide a control configuration that is adapted to the specific setup or arrangement of appliances installed by the user. For example, where there are multiple appliances which can heat the premises (such as first, second and third stages of heating), it may be desirable to make use of only one stage most of the time (e.g. to save energy/power) but in order to reach desired temperatures more speedily it may be desirable to use further stages when there is a large difference between the desired temperature and the measured temperature. Thus by validating the user inputs and connections to the controller, such control can be provided. In one example, a user indication of a dual fuel system, validated by the detected connections corresponding to the expected connection configuration, may indicate a heat pump and a (gas) furnace are connected. In such a case, the heat pump may be used for heating until there is more than a predetermined temperature difference between the desired temperature and the measured temperature (the predetermined difference may e.g. be around 2° C., around 4° C., around 5° C. or around 8° C.).

In another example, there may be different appliances which are best used in conjunction with each other. For example, fans and furnaces may work well in conjunction. Thus if the determined expected configuration and the detected connections both show that a fan and a furnace are connected, a control setting may be configured to allow control of the fan in heat mode. In some embodiments it may be In some cases configuring an environmental control setting refers to initial configuration upon installation of the thermostat. Initial configuration may involve altering factory or default (e.g. generic) control settings. In other cases, configuring an environmental control setting may comprise changing or altering previously set control settings, e.g. following a rewiring or installation of a new appliance.

The method (and in particular the step of displaying user queries) may be triggered by detecting that the environmental controller has been switched on for the first time (e.g. in the case of initial configuration). Alternatively or additionally, the method (and in particular the step of displaying user queries) may be triggered by detecting that the wiring configuration has changed, for example if it is detected that one or more connections have been added to or removed from the plurality of connection terminals.

In some embodiments, the at least one user input comprises an indication of the manner in which the environmental controller is arranged to influence one or more environmental parameters at the premises.

From the manner in which the controller or the appliances are arranged to influence the environmental parameters it is possible to infer which type of appliances, and therefore which connections should (or could) be made to the controller. Thus in order to answer the query, the user may not need to know exactly what types of appliances they have connected, as long as they are aware of the intended function.

For example, the intended influences or functions of the appliances may include heating; cooling; humidifying; and dehumidifying.

Optionally, at least one of the series of user queries comprises a request for the user to specify the type of at least one of the one or more appliances.

Thus it may be possible for the user to indicate the appliances they believe they have connected to the controller. This may make it possible to identify whether the user has connected the appliances incorrectly, e.g. to the wrong connection terminal, or has incorrectly identified which appliances are connected.

Preferably, the type of appliances are selected from the list comprising: a gas, propane and/or oil furnace; a boiler; an electric air handler; a heat pump; a dual fuel, hybrid and/or combined system; an air conditioning unit; a dehumidifier; a humidifier; a fan; a ventilation system (which may ventilate all or part of a dwelling or premises); and a space heating system.

Such devices (or combinations of devices, such as a dual fuel/hybrid system) may each have their own specific functions within the environmental control system.

Preferably, one or more of the user queries comprises one or more user-selectable options.

By providing the user with selectable options it is possible to reduce the chances of a user making an error in responding to the query because the response is limited to one of a few possibilities, rather than being open-ended (for example in the case where a user is presented with a blank field to be filled in).

Preferably, the physical connection terminals on the environmental controller are each arranged to receive a control wire for an environmental control appliance and/or a wire from a power supply, and wherein detecting connections at the plurality of physical connection terminals comprises detecting whether a control wire is received in each physical connection terminal.

A power supply may, for example, comprise a power supply for the environmental controller itself.

In some embodiments, the environmental controller comprises at least two physical connection terminals arranged to receive a control wire for an environmental control appliance, and wherein each of the at least two physical connection terminals are capable of providing control commands to a different set of one or more types of appliance.

By providing different types of physical connection terminals which are adapted to control different types of appliance (e.g. one may output heating commands and another may output cooling commands, or yet another humidity commands) it may be possible to make a more accurate determination of whether a user has made an error in the connections (for example compared to the case where all terminals are operable to command any type of appliance).

In some cases, one or more of the physical connection terminals may be adapted to control two or more different types of appliance (e.g. a Y terminal may be used to control an air conditioning unit or the cooling function of a heat pump).

In some embodiments, detecting connections at the plurality of physical connection terminals is based on physical sensing by a component associated with the physical connection terminals which physically senses whether there is a connection at each physical connection terminal.

Physical sensing of a connection may provide an accurate indication of whether a connection has been made at the terminal.

Preferably, the component associated with the physical connection terminals comprises a mechanical switch or pin coupled to each physical connection terminal, which provides a simply way to detect connections. For example, the depression of a switch or pin may cause an electrical circuit to close and an electrical signal/message to be sent to a processor in the environmental controller, which indicates that there is a connection at that terminal. In some embodiments detecting connections at the plurality of physical connection terminals is based on optical detection.

In some embodiments, detecting connections at the plurality of physical connection terminals comprises is based on electrical detection sensing of whether there is a connection at each physical connection terminal. In some cases this electrical sensing is provided in conjunction with physical or mechanical detection or sensing.

Preferably, the electrical sensing further comprises detecting a voltage or current at each physical connection terminal.

By detecting voltage or current of connectors at the terminals it may be possible to discover more information about the type of connection that has been made to the terminal, for example whether the connection is to an appliance or to a power supply.

In some embodiments, the step of validating the at least one user input further comprises comparing an expected voltage or current at each physical connection terminal with the detected voltage or current at each physical connection terminal, preferably wherein the expected voltage or current at each physical connection terminal is determined based on the determined expected connection configuration. Thus it may be possible to predict or determine the type of connection made more accurately. For example, a connection made to a power supply may be expected to have a much higher current/voltage than a control wire to an appliance.

Sometimes optical detection capability may be provided in conjunction with electrical and/or mechanical detection capability.

Preferably, the display of the user queries is on a touchscreen display of the user interface, more preferably wherein receiving response is via the touchscreen display.

There is also described herein a computer-readable medium comprising software code adapted, when executed on a data processing apparatus, to perform a method as set out above.

There is also described herein: an environmental controller for controlling an environmental control system comprising one or more appliances for influencing one or more environmental parameters at a premises, the environmental controller comprising: a memory; a user interface for displaying information and queries to a user and for receiving user inputs; physical terminal interface comprising a plurality of physical connection terminals for receiving connections to appliances; a connection detection module for detecting connections at the plurality of physical connection terminals; a processor operable: to display on the user interface at least one user query from a series of user queries; to receive, in response to the at least one user query, at least one user input at the user interface, the at least one user input relating to at least one of the one or more appliances intended to be controlled by the environmental controller; to determine an expected connection configuration for a plurality of physical connection terminals on the environmental controller based on the at least one user input; following determining the expected connection configuration, to detect connections at the plurality of physical connection terminals; and to validate the at least one user input by comparing the detected connections to the plurality of physical connection terminals with the expected connection configuration.

Preferably, the processor is further operable: upon determining a divergence between the detected connections to the plurality of physical connection terminals and the expected connection configuration, to display an error message on the user interface.

More preferably, the processor is further operable: upon determining a divergence between the detected connections to the plurality of physical connection terminals and the expected connection configuration, to disable one or more control functions of the controller.

Preferably, the processor is further operable: upon determining that detected connections to the plurality of physical connection terminals match the expected connection configuration, to configure an environmental control setting of the environmental controller.

Optionally, the at least one user input comprises an indication of the manner in which the environmental controller is arranged to influence one or more environmental parameters at the premises; preferably wherein the manner in which the environmental controller is arranged to influence one or more environmental parameters comprises one or more of: heating; cooling; humidifying; and dehumidifying.

Preferably, at least one of the series of user queries comprises a request for the user to specify the type of at least one of the one or more appliances.

Preferably, the type of appliances are selected from the list comprising: a gas, propane and/or oil furnace; a boiler; an electric air handler; a heat pump; a dual fuel, hybrid and/or combined system; an air conditioning unit; a dehumidifier; a humidifier; a fan; a ventilation system (which may ventilate all or part of a dwelling or premises); and a space heating system.

Optionally, one or more of the user queries comprises one or more user-selectable options.

Preferably, the physical connection terminals are each arranged to receive a control wire for an environmental control appliance and/or a wire from a power supply, and the connection detection module is configured to detect connections at the plurality of physical connection terminals by detecting whether a control wire is received in each physical connection terminal.

Preferably, the physical terminal interface comprises at least two physical connection terminals arranged to receive a control wire for an environmental control appliance, and wherein each of the at least two physical connection terminals are capable of providing control commands to a different set of one or more types of appliance.

In some embodiments, the physical terminal interface comprises a plurality of physical or mechanical detectors or components for detecting connections physically at the plurality of physical connection terminals.

Preferably, the mechanical detectors each comprise a mechanical switch or pin for detecting a connection at the respective physical detection terminals. In some embodiments, physical detectors are operable to detect the presence of connections optically.

Optionally, the physical terminal interface comprises a plurality of electrical detectors or components for electrically detecting connections at the plurality of physical connection terminals.

Preferably, the electrical detectors are operable to detect a voltage and/or current at the physical connection terminals. For example, they may comprise a voltmeter and/or an ammeter.

In some embodiments, the processor is operable to validating the at least one user input by comparing an expected voltage or current at each physical connection terminal with the detected voltage or current at each physical connection terminal, preferably wherein the expected voltage or current at each physical connection terminal is determined based on the determined expected connection configuration.

In some embodiments, the user interface comprises a touchscreen display for displaying the series of queries and receiving the user inputs.

Where reference is made above to means for performing a given processing step, such means may be provided in the form of a processor with associated memory (e.g. storing software code for execution by the processor).

Any feature in one aspect of the invention may be applied to other aspects of the invention, in any appropriate combination. In particular, method features may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Embodiments will now be described, by way of example only and with reference to the accompanying drawings, in which.

DETAILED DESCRIPTION

Figure 1:
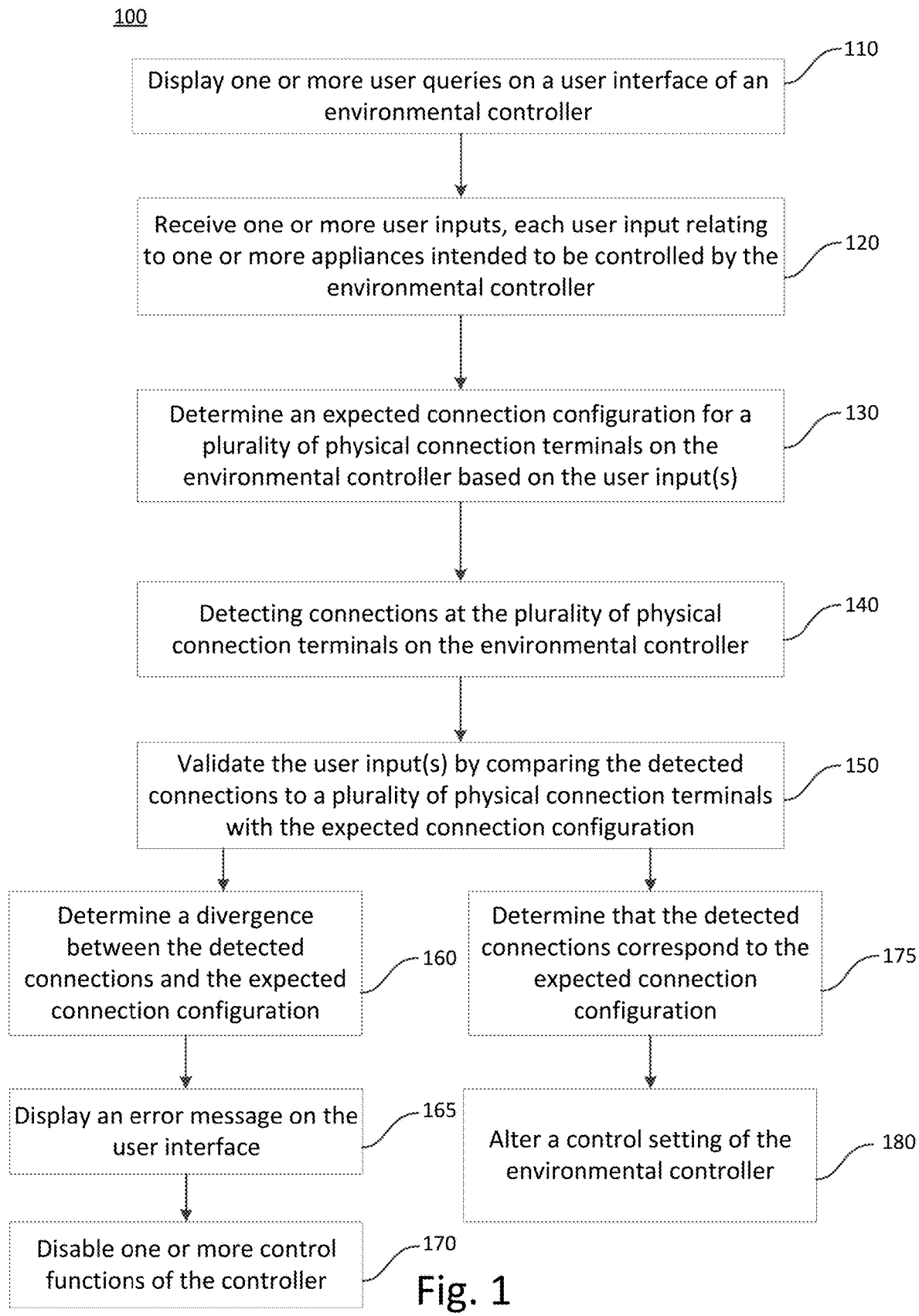
FIG. 1 shows an exemplary method for validating user inputs and connections to an environmental controller.

FIG. 1 shows a method 100 of setting the operational configuration of an environmental controller based on connections and user inputs.

At step 110 one or more user queries are displayed on a user interface of the environmental controller. Such queries may ask the user about the types of devices or appliances they have connected, or they may ask the user to specify the type of environmental control that is intended to be provided by the system controlled by the environmental controller, for example whether the system in capable of heating, cooling, humidifying and/or dehumidifying.

At step 120 one or more user inputs are received via the user interface of the environmental controller. Each of those inputs may relates to one or more appliances which are intended to be controlled by the environmental controller. For example an input indicating that heating is possible can indicate that some form of heating device such as a furnace, a boiler or a heat pump should be present in the system.

At step 130 a determination is made of the expected connection configuration to a plurality of physical connection terminals on the environmental controller. This determination is made based on the user inputs given at step 120. The determination may, for example, result in an expected connection configuration in which one or more of the physical connection terminals are expected to definitely have connections, one or more of the physical connection terminals possibly have connections and/or one or more of the physical connection terminals definitely do not have connections. Further information, such as expected ranges of current or voltage at each connection terminal, may also be provided.

At step 140 the connections at the plurality of physical connection terminals are detected. For example this may be a mechanical or electrical indication, which may indicate whether one or more wires is mechanically and/or electrically connected to each physical connection terminal. Where electrical detection is present, further information such as the current or voltage at each connection terminal may also be detected.

At step 150 the user inputs are validated by comparing the detected connections with the expected connection configuration. Therefore any divergence between the connections that have actually been made and the connections that were expected to be made based on the user's inputs can be identified.

The method may progress to step 160, where it is determined that there is a divergence between the detected connections and the expected connection configuration. Therefore the method proceeds to step 165 where an error message is displayed on the user interface of the environmental controller. Such an error message may for example inform the user that they should check the wiring they have connected and/or that they should check the inputs they have made. It may also give the user an opportunity to return to one or more of the user queries so that they can re-enter their responses.

At step 170 one or more control functions of the environmental controller are disabled. This can be an important safety feature as it may prevent inappropriate or incorrect signals being sent to command various appliances. If incorrect signals are sent to appliances this may be detrimental to the appliance (e.g. it may damage the appliance) or it may cause problems in the environmental control of the house or premises. It is likely that signals sent to appliances incorrectly (e.g. signals intended for other appliances) would result in self optimal performance of the environmental control system. By disabling such commands or control functions, this may be avoided.

In some cases it may be determined following step 150, at step 175, that the detected connections do correspond to or match the expected connection configuration. In this case the method proceeds to step 180, where a control setting of the environmental controller is altered, or set for the first time (in the case of initial configuration). For example if a gas furnace has been indicated as present by the user, the controller may allow control commands to be sent to a fan whilst the controller is in heat mode i.e. when it is sending commands to an environmental control appliance in order to increase the temperature of the premises. In another example, if it is determined that only an air conditioning unit is connected then the thermostat or controller will only be able to control cooling functions.

Figure 2:
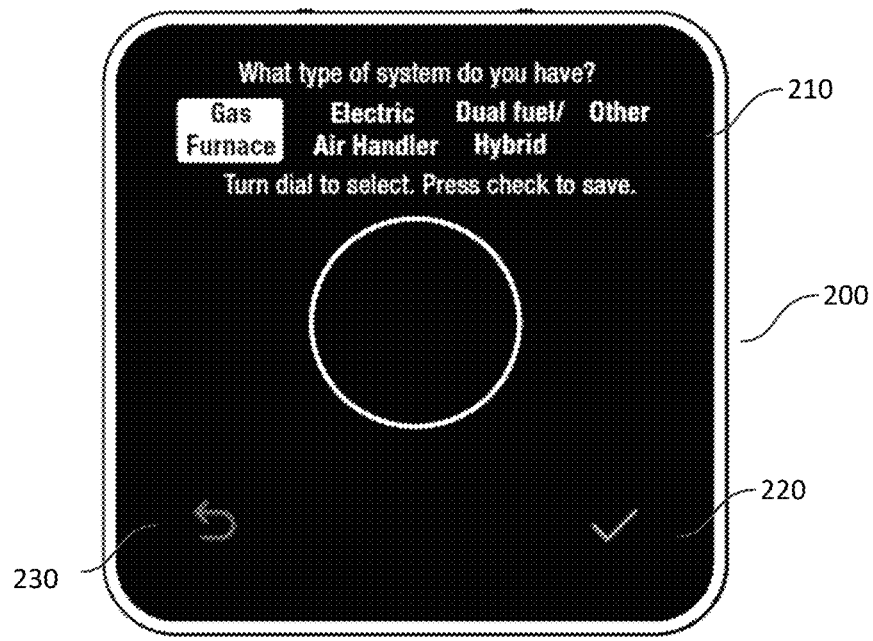
FIG. 2 illustrates an exemplary query to be displayed to a user on a user interface of an environmental controller.

FIG. 2 shows a query which asks the user what type of environmental control system they have. The query is displayed on the user interface, or screen, of an environmental controller 200. The user is presented with four selectable options 210. The selectable options 210 comprise gas furnace, electric air handler, dual fuel/hybrid or other. There is a dial provided on the user interface of the environmental controller which allows the user to move a cursor or selection between the selectable options 210. There is also provided capacitive buttons 220, 230 for confirming the selection of one of the options. In this case button 220 allows the user to confirm their selection of one of the options 210. Button 230 allows the user to return to a previous menu or query.

Figure 3:
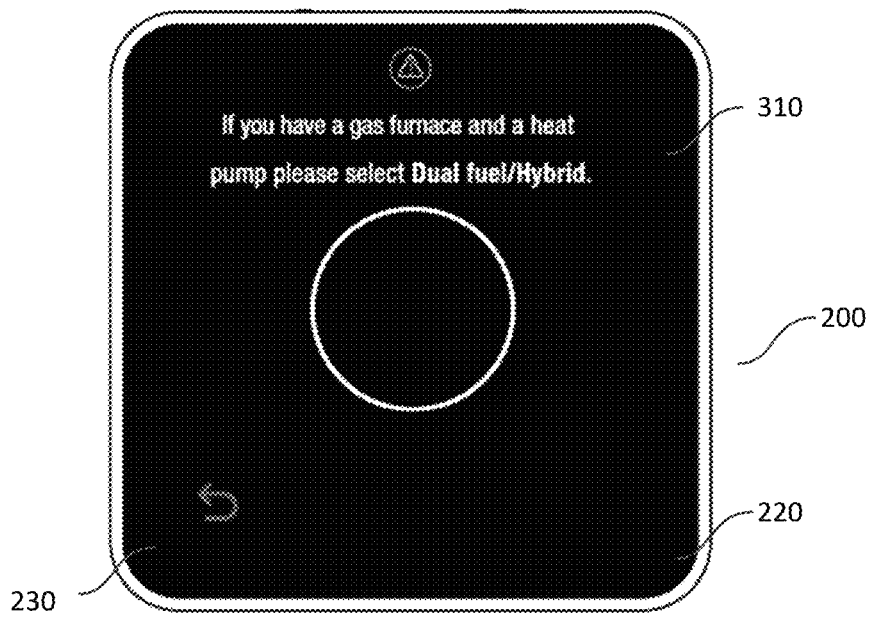
FIG. 3 shows an exemplary error message to be displayed on a user interface of an environmental controller.

FIG. 3 illustrates an error message 310 that may be presented on the user interface or screen of an environmental controller 200. The error message 310 may be presented after the selectable options 210 shown in FIG. 2 have been presented to the user and after a determination of an expected connection configuration has been made based on the user's answer.

In particular, the error message 310 is presented if the user has indicated, in response to the query of FIG. 2, that they have a gas furnace system but they have connected something to the O/B connection terminal. Following the user response, a determination was made that the O/B connection terminal (which is arranged for connecting to and for controlling a heat pump) should not have a connection. Since a connection is detected at the O/B connection terminal, the comparison between expected connections and detected connections shows they do not correspond. Therefore the error message 310 requests the user to select a dual fuel/hybrid option if they have a gas furnace and a heat pump. Here the user is given the option 230 of returning to a previous screen, but the option 220 for selecting is not shown.

Figure 4:
FIG. 4 shows a further exemplary error message to be displayed on a user interface of an environmental controller.

FIG. 4 illustrates an error message 320 which is presented if a user has selected a dual fuel system but one or more of the O/B, Y1 and W1 terminals do not have connections.

For example, error message 320 may be presented if the user has selected the "Dual fuel/Hybrid" option in response to query 210 of FIG. 2. Following the user response a determination is made that connections are expected to at least the O/B (heat pump reverse switch), Y1 (primary cooling) and W1 (primary heating) connection terminals. It is then detected that at least one of these connection terminals does not have a wire connected, so error message 320 is shown. The error message 320 informs the user that the wiring does not match a Dual fuel/hybrid system and requests that they check the wires. Once again, the user is given the option 230 of returning to a previous screen, but the option 220 for selecting is not shown.

Figure 5:
FIG. 5 also shows an exemplary error message to be displayed on a user interface of an environmental controller.

FIG. 5 illustrates an error message 330 which is presented if the user has indicated they have an electric air handler but no first stage cooling wire is detected.

For example, the error message 330 may be presented following the user selecting the "electric air handler" option in response to query 210 of FIG. 2. Then the determined expected connection configuration indicates that at least the stage one cooling Y1 connection terminal should have a connection. If it is detected that the Y1 connection terminal does not have a connection then error message 330 is displayed on the user interface of controller 200.

Figure 6:
FIG. 6 shows a further exemplary error message to be displayed on a user interface of an environmental controller.

FIG. 6 illustrates an error message 340 which is presented if the user has indicated they have a gas furnace but no first stage heating wire is detected.

For example, the error message 340 may be presented following the user selecting the "gas furnace" option in response to query 210 of FIG. 2. Then the determined expected connection configuration indicates that at least the stage one heating W1 connection terminal should have a connection. If it is detected that the W1 connection terminal does not have a connection then error message 340 is displayed on the user interface of controller 200.

Figure 7:
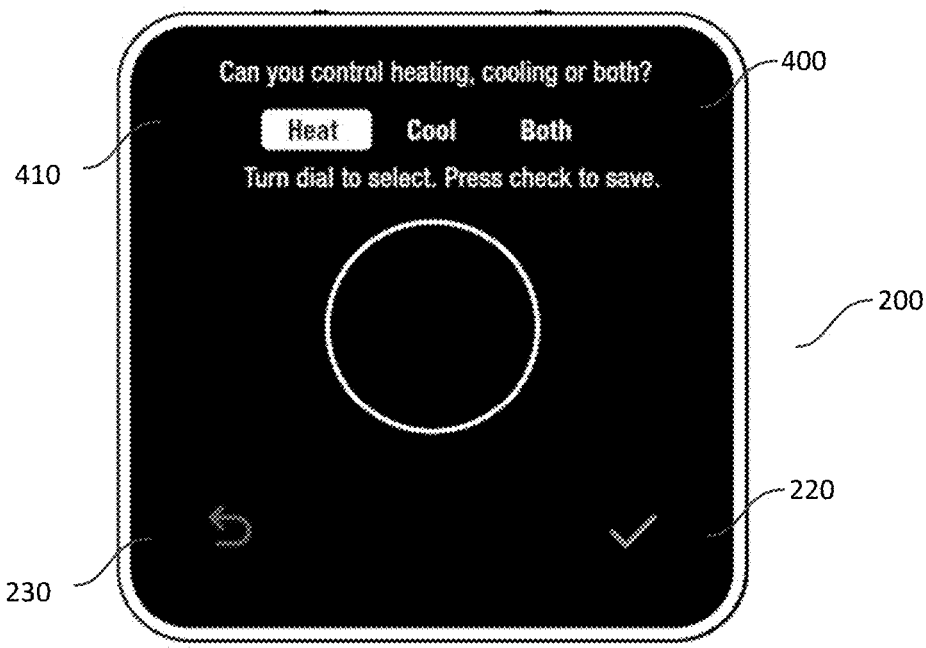
FIG. 7 shows an exemplary user query to be presented on a screen of an environmental controller.

FIG. 7 illustrates a user query 400 presented on the user interface of the environmental controller 200. User query 400 asks the user what temperature functions they can control and presents the user with three options 410 for responding to the query: "heat", "cool" or "both".

There is also provided capacitive buttons 220, 230 for confirming the selection of one of the options. In this case button 220 allows the user to confirm their selection of one of the options 210. Button 230 allows the user to return to a previous menu or query.

Figure 8A:
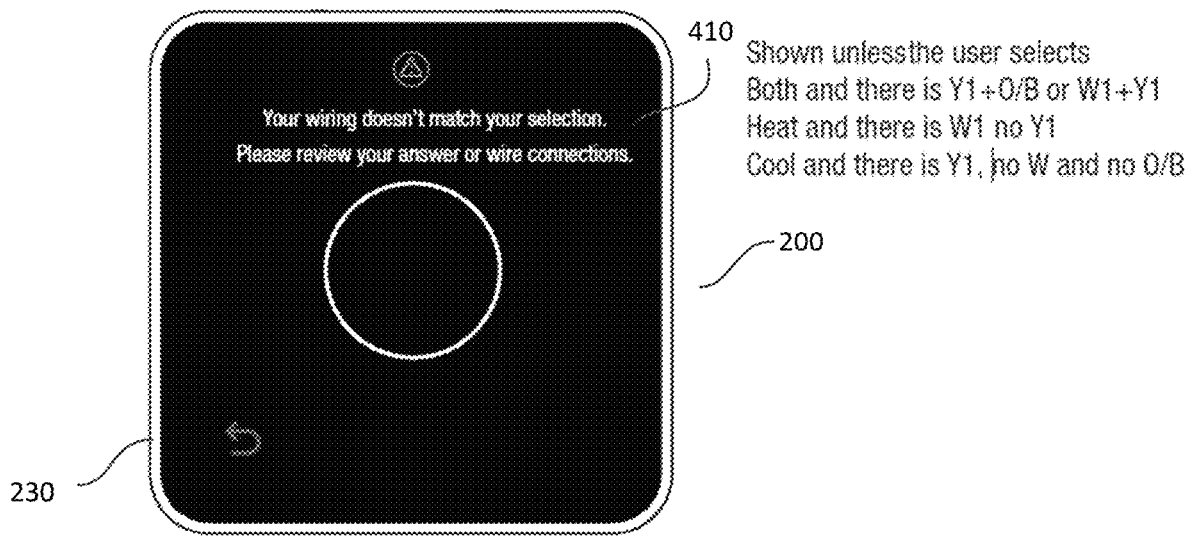
FIG. 8A shows an exemplary error message to be displayed on a user interface of an environmental controller when detected wiring does not match a user's responses.

FIG. 8A illustrates an error message 410 that may be displayed on the environmental controller 200. The error message 410 indicates that the wiring doesn't match a selection made by the user and requests that the user reviews the answer or wire connections. Button 230 is also available to allow the user to return to a previous menu or query, for example to query 400.

The error message 410 may be shown in several circumstances, for example:

If the user has selected "both" in response to query 400. Then the expected connection configuration is that cooling terminal Y1 will have a connection and at least the O/B heat pump reverser terminal or the first stage heating terminal W1 will have a connection. Thus if the user selected "both" in response to query 400 and the detected connections show that Y1 does not have a connection and/or there is no connection at one of W1 and O/B, then error message 410 will be shown.

If the user has selected "heat" in response to query 400 then the expected connection configuration is that there is a connection to at least the first stage W1 terminal and that there is no connection to the first stage cooling terminal Y1. If the detected connections to the terminals show that there is no connection at W1 and/or that there is a connection at Y1 then error message 410 will be shown.

If the user has selected "cool" then it is expected that there will be a connection to at least the first stage cooling connection terminal Y1 and no connection to any of the heat terminals (W1, W2 or W3) or to the heat pump switch O/B terminal. If the detected connections to the terminal show that there is a connection to any of the heat terminals or to the O/B terminal or that there is no connection to the Y1 terminal then error message 410 will be shown.

Figure 8B:
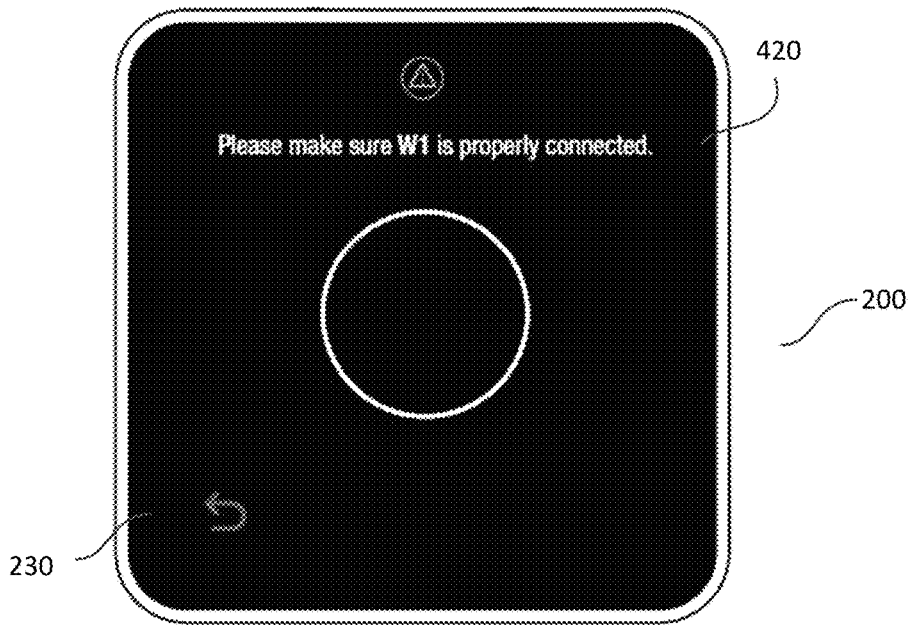
FIG. 8B shows another exemplary error message to be displayed on a user interface of an environmental controller when detected wiring does not match a user's responses.

FIG. 8B illustrates an error message 420 that may be shown on the interface of the environmental controller 200. The error message 420 asks the user to ensure the first stage heating W1 wire is properly connected. The error message 420 may be displayed if the user selected "heat" in response to query 400, which indicates a connection at the first stage heating W1 terminal would be present. If it is detected that there is a connection at the W2 terminal but not at the W1 terminal then error message 420 is displayed.

Figure 9:
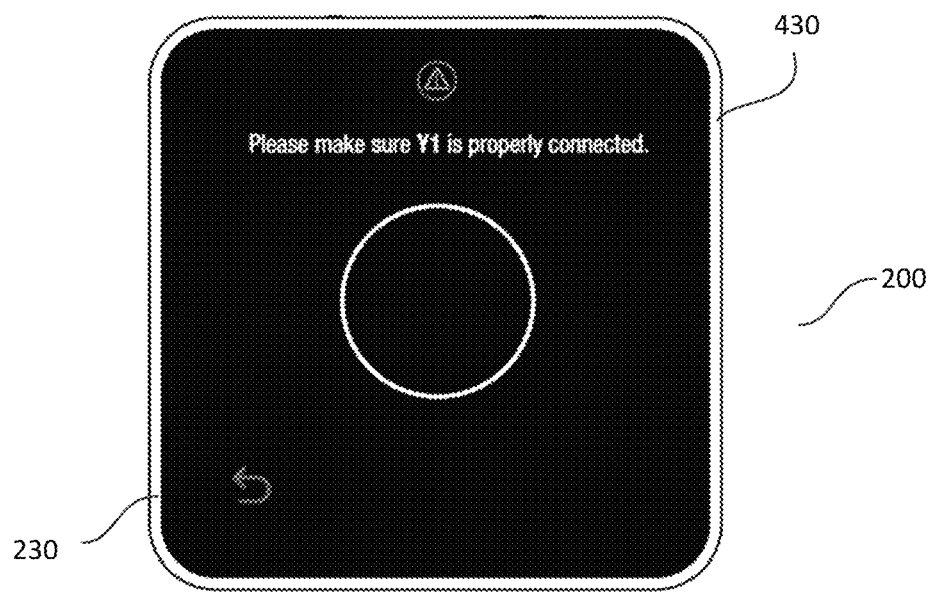
FIG. 9 shows a further exemplary error message to be displayed on a user interface of an environmental controller.

FIG. 9 illustrates an error message 430 which may be displayed on the interface of the environmental controller 200. The error message 430 asks the user to ensure that the Y1 wire is properly connected. The error message 430 may be shown following the user selecting "cool" in response to query 400, which gives an expected connection at least at the Y1 terminal, and if it is detected that there is no connection at the Y1 terminal but there is a connection at the Y2 terminal.

Figure 10:
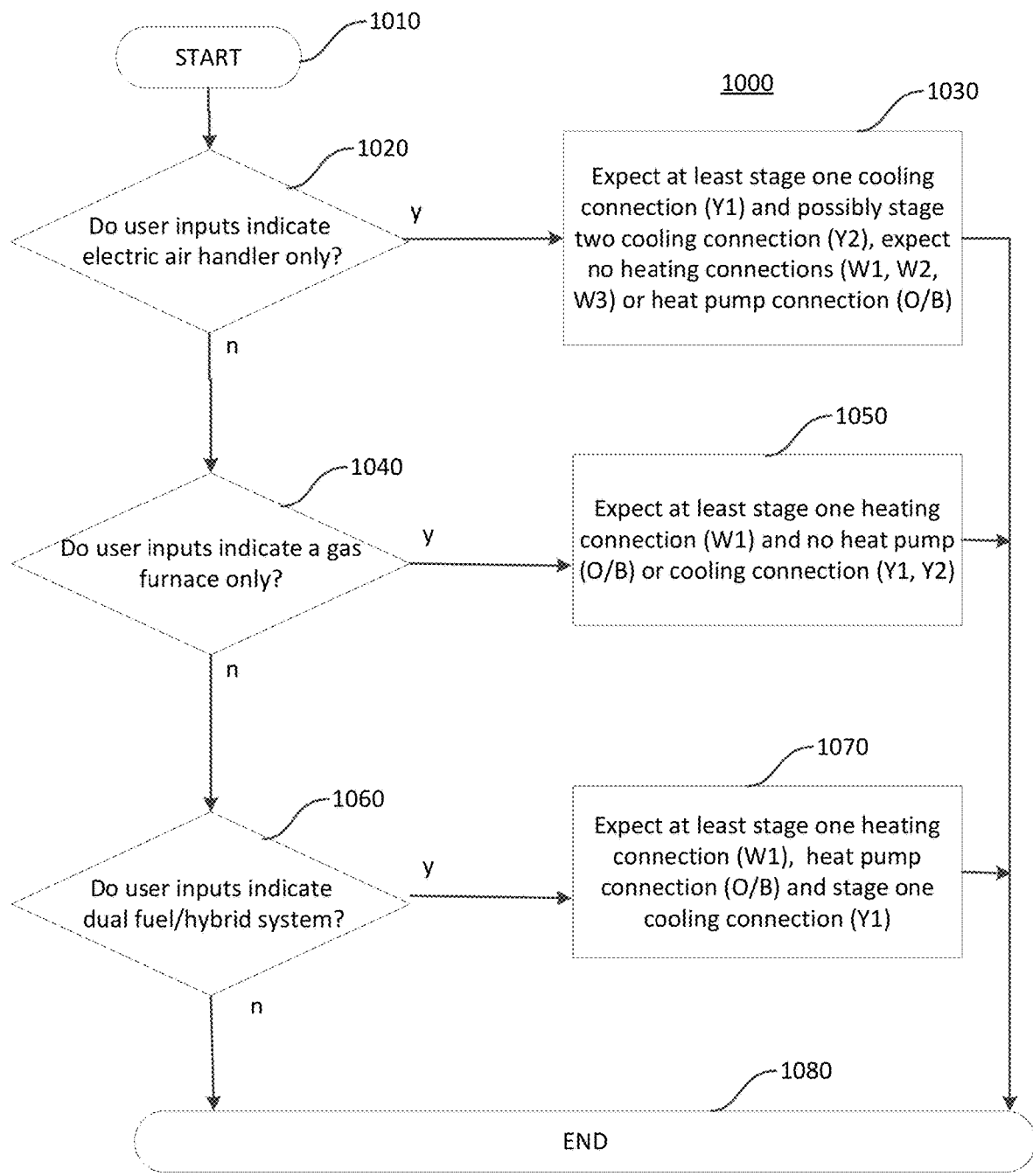
FIG. 10 shows an exemplary flow chart of a method for determining expected connection configurations based on responses to user queries.

FIG. 10 illustrates an exemplary flow chart of a method 1000 for determining an expected connection configuration based on the user's responses. For example, this method 1000 may be performed at step 130 of method 100 illustrated in FIG. 1.

The method 1000 starts at step 1010. At step 1020 a determination is made as to whether the user has indicated they have an electric air handler only. For example, this may be in response to the query shown in FIG. 2.

If it is determined at step 1020 that the user has responded with "air handler" then the method continues to step 1030, where the expected connection configuration is determined. In this case, a stage one cooling connection (Y1) is definitely expected and possibly a stage two cooling connection (Y2). The expected heating configuration will also indicate that there will be no heating connections (W1, W2, W3) or heat pump connection (O/B). The method then ends at step 1080.

If at step 1020 it was determined that the user did not select electric air handler then the method progresses to step 1040. At step 1040 it is determined whether the user indicated they had a gas furnace only. If the user did, then the method progresses to step 1050. At step 1050 an expected connection configuration is determined that shows there should be at least a stage one heating connection (W1) and no heat pump (O/B) or cooling connection (Y1, Y2). The method then ends at step 1080.

If at step 1040 it was determined that the user had not indicated a gas furnace only, then the method progresses to step 1060, where it is determined whether the user inputs indicate a dual fuel or hybrid system. If so, the method progresses to step 1070, where it is determined that the expected connection configuration includes at least a connection to the stage one heating connection (W1), the heat pump connection (O/B) and the stage one cooling connection (Y1). The method then ends at step 1080.

If at step 1040 it was determined that the user did not select dual fuel/hybrid then the method ends at step 1080. In this case the user has not provided any information on which to base an expected heating configuration.

Figure 11:
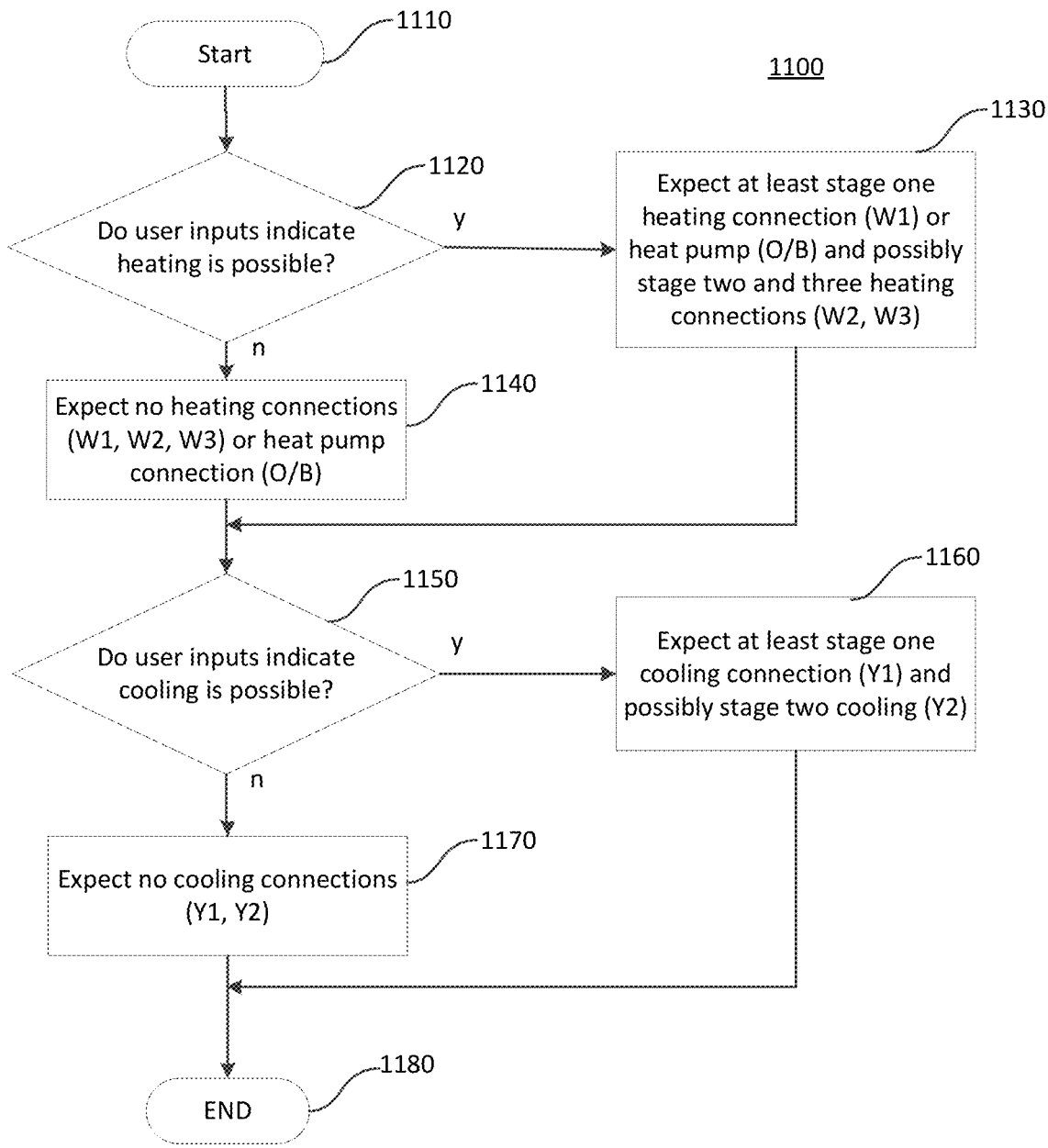
FIG. 11 shows a further exemplary method for determining an expected connection configuration based on user inputs.

FIG. 11 illustrates an exemplary flow chart of a method 1100 for determining an expected connection configuration based on the user's responses. For example, this method 1100 may be performed at step 130 of method 100 illustrated in FIG. 1. The method 1100 may follow on from method 1000 shown in FIG. 10, or method 1000 of FIG. 10 may be performed following method 1100 of FIG. 11.

The method 1100 starts at step 1110. Then at step 1120 it is determined whether the user inputs indicate that heating is possible. For example, this may be based on the user's response to query 410 shown in FIG. 7. In that case, heating may be possible if a user has selected "heat" or "both".

If the user has indicated that heating is possible the method progresses to step 1130, where the expected connection configuration is determined. In this connection configuration, connections are expected to at least stage one heating terminal (W1) or the heat pump terminal (O/B). The connection configuration may also specify that connections may be present at the stage two and three heating connections (W2, W3).

If it is determined at step 1120 that the user did not indicate heating is possible (e.g. by selecting "cool") then the method progresses to step 1140 where the expected connection configuration is determined to include no heating connections (W1, W2, W3) or heat pump connection (O/B).

The method then progresses (either from step 1130 or from step 1140) onto step 1150 where it is determined whether the user inputs indicate that cooling is possible. If it is determined at step 1150 that cooling is possible (e.g. by the user selecting "cool" or "both") then the method progresses to step 1160. At step 1160 the expected connection configuration is modified to indicate connections are expected to at least the stage one cooling terminal (Y1) and possibly to the stage two cooling terminal (Y2). The method then ends at step 1180.

If at step 1150 it is determined that the user inputs indicate cooling is not possible then the method progresses to step 1170. At step 1170 it is determined that the expected connection configuration is that there will be no connection to the first or second stage cooling terminals (Y1, Y2). The method then ends at step 1180.

Figure 12:
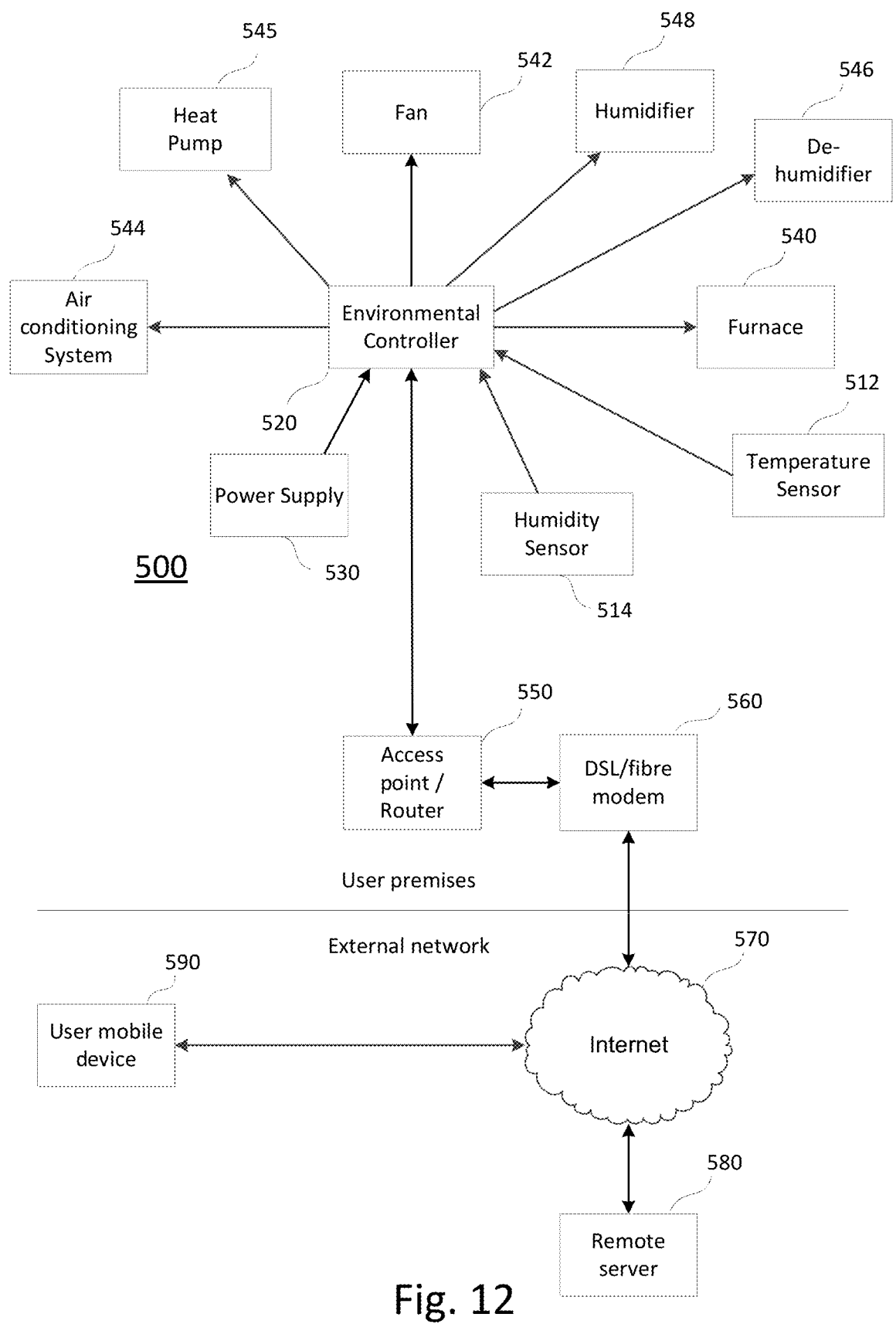
FIG. 12 illustrates a system diagram of an exemplary environmental control system.

FIG. 12 illustrates a system diagram of an exemplary environmental control system 500. The environmental control system 500 includes an environmental controller 520 installed in a user's premises. The environmental controller 520 is connected to a temperature sensor 512 and a humidity sensor 514 installed within the user's premises via wired or wireless connections. However in some embodiments one or both of the sensors 512, 514 may be combined in the environmental controller 520.

The environmental controller 520 may be, for example, a smart thermostat into which a user can program a heating, hot water or other environmental control schedule. The environmental controller 520 is connected wirelessly to the user's local network/internet access infrastructure, for example, to a wireless or wired home router/access point 550, which in turn provides access to the Internet 570 through a modem 560, such as an ADSL or fibre modem. Depending on access technology, router 550 and modem 560 may be combined in a single device or replaced with other access devices appropriate to the access technology. Some embodiments may provide an additional hub device (not shown), e.g. connected to the boiler 540, to manage the HVAC system and coordinate between the components or appliances, store control/configuration data (e.g. heating schedules), and the like (such functionality may alternatively be implemented in the environmental controller 520).

The environmental controller 520 is connected through wired connections to various appliances for influencing environmental parameters at the premises, such as temperature and humidity. The appliances to which the environmental controller is connected include a furnace 540, a fan 542, an air conditioning unit 544, a heat pump 545, a dehumidifier 546 and a humidifier 548. The furnace 540 may, for example, be a conventional gas furnace or electric furnace arranged to provide a supply of heated air to be distributed through rooms in the user's premises. In some embodiments a boiler for heating hot water for distributing through a space heating system and/or for providing a domestic hot water supply may be present.

The appliances are connected via wires to the environmental controller 520. Wires from the appliances are connected to physical connection terminal in the environmental controller 520. The environmental controller 520 may have different physical connection terminal for connecting different types of appliance. For example, an O/B connection terminal may be provided for connecting to the heat pump 545 and a W1 connection terminal may be provided for connecting to a first stage heating appliance, such as the furnace 540. There may be provided means for detecting whether there is a wire connected to each of the connection terminals.

The environmental controller 520 has a user interface for displaying information and queries to a user and for receiving user inputs, such as control settings or responses to the queries.

Although six HVAC components/appliances 540, 542, 544, 545 546, 548 are shown, in some embodiments fewer HVAC components or appliances may be provided, such as one or two, whilst in other embodiments there may be more and/or different. There is also provided a power supply 530 for supplying power to the environmental controller 520. For example, this may be a mains electricity power supply, or alternatively it may be a cell/battery power supply integrated into the environmental controller 520.

The environmental controller 520 can store schedule and other information relevant to the control information of the appliances. The environmental controller 520 can then send control and/or schedule information to the HVAC appliances 540, 542, 544, 546, 548. For example the user can program a schedule for desired room temperature at the environmental HVAC controller 520, and the environmental controller 520 can then send control signals to the furnace 540, fan 542, heat pump 545, and air conditioning system 544 in order to influence the room temperature according to the user's schedule. An acceptable schedule for the humidity level may also be set, which may be influenced by the environmental controller sending commands to the fan 542, humidifier 548 and dehumidifier 546, as appropriate.

Programming an environmental control schedule may involve specifying a set of set points for environmental parameters or characteristics (e.g. temperature and humidity) which are applicable during respective time periods, each set point defining a target environmental characteristic value or acceptable range of values to be achieved and maintained during the period. For example, the user may request a room temperature of 20° C. between 7 am and 9 am. Other periods in the schedule may be designated as "off" periods where no heating is required (though the system may nevertheless apply some minimum target e.g. 5° C. during such periods to protect against frost damage). The environmental controller 520 receives a room temperature reading (either from its own internal temperature sensor and humidity sensor, or from temperature sensor 512 and humidity sensor 514) and can provide control signals to the various appliances, as appropriate (e.g. to increase or decrease the environmental paramter back to the scheduled target value).

The user may also interact with the HVAC system 500 from a mobile user device 590 located outside the user's premises on an external network and connected to the Internet 570. The user mobile device 590 may take the form of a smartphone, tablet computer, personal computer, smart watch and the like. The user mobile device 590 may include an application for controlling the environmental control system 500, for example to create or edit a space heating/hot water/humidity schedule, switch between manual/scheduled operation, adjust temperature, activate boost mode, etc. The application may then send information to the environmental controller 520 as required (e.g. to update a schedule).

There may also be provided a remote server 580, such as a cloud server, on an external network, which may be connected to the Internet 570. The environmental controller 520 and/or the user's mobile device 590 may be in communication with the remote server or datacentre 580. The HVAC controller and/or the mobile device 590 can also or alternatively send control information and sensed information to the remote server 580 via its connection to the Internet 570. The remote datacentre 580 can log this information and store for analysis information ascribed to periods during which HVAC components are operating.

While this description has focused on the home environment, the invention can also be used in offices or other premises in which environmental conditions such as room temperature and humidity are controlled.

Although only a single temperature sensor and a single humidity sensor installed in at least one room in the user's premises are described above, in some embodiments multiple sensors may be provided at different locations within the premises so that more information about the performance of the HVAC system can be collected. For example, one temperature sensor and/or humidity sensor may be provided for each zone in the user's house. In some cases multiple sensors can improve the accuracy of the monitoring. Multiple environmental controllers or thermostats may also be provided for controlling different zones at the premises.

It is also possible to position sensors outside the environment controlled by the HVAC system (e.g. air temperature and humidity sensor located outside a house). By measuring outside characteristics, it may be possible to provide better control for the system (e.g. more heat may be required to maintain a target room temperature if it is colder outside).

Figure 13:
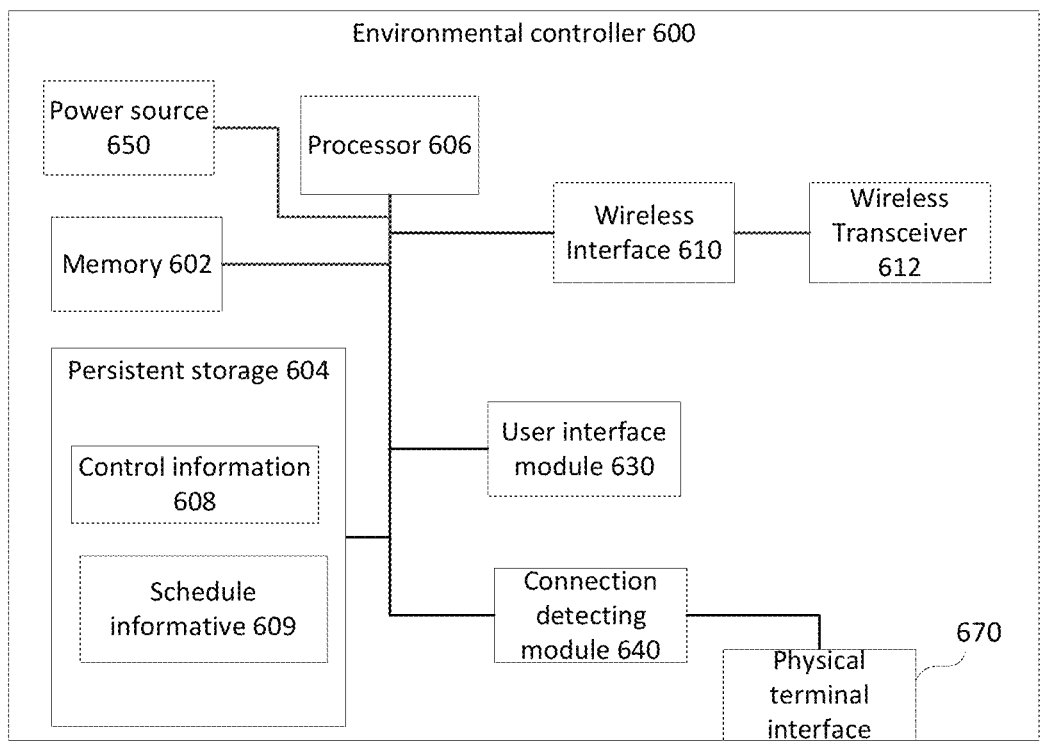
FIG. 13 illustrates the hardware architecture of an exemplary environmental controller.

FIG. 13 illustrates the hardware architecture of an exemplary environmental controller 600 that may be provided for controlling an environmental control system. For example, the environmental controller 520 of FIG. 12 may have the hardware architecture as shown in the environmental controller 600 of FIG. 12.

The environmental controller 600 includes a processor 606 together with volatile/random access memory 602 for storing temporary data and software code being executed. Random access memory 602 may be used to store environmental parameter information indicative of the environmental conditions of the premises and also to store commands to be sent to the environmental appliances. Persistent storage 604 may store control information 608 and may store environmental schedule information 609. Persistent storage 604 may include other software and data, such as an operating system, device drivers, software configuration data, historical location data, historical user command data, such as previously selected user control commands, and the like.

Communication with the remote server 580 via the Internet 570 may occur via a wireless network interface 610 and wireless transceiver 612. For example, the wireless transceiver 612 may be capable of connecting to the Internet via a wireless local area network (WLAN) such as Wi-Fi™ IEEE 802.11 or Zigbee. In some cases, multiple wireless transceivers, and optionally multiple wireless interfaces, may be provided for different communication protocols.

The environmental controller 600 also includes a physical terminal interface 670 for receiving wired connections to environmental control appliances. The physical terminal interface 670 includes a plurality of physical connection terminals for receiving wires. The environmental controller 600 also includes a connection detection module 640 in communication with the physical terminal interface 670 for detecting which terminals have connections. This may include circuitry which is coupled to mechanical and/or electrical detectors in the terminals for detecting whether the terminals have a connection.

A user interface module/component 630 is also included in the environmental controller 600 for interacting with the user, such as for displaying information, options and queries on a screen of the device 600 and for receiving user interactions and inputs such as touch data from a touchscreen, button data or voice data.

The device components are interconnected by a data bus (this may in practice consist of several distinct buses such as a memory bus and I/O bus).

The environmental controller 600 comprises a power source 650 for providing power to the environmental controller 600, for example a battery or cell arrangement. However in some embodiments there is no integrated power supply and instead a physical connection terminal is provided in the physical terminal interface 670 for connecting to a mains power supply.

While a specific architecture is shown, any appropriate hardware/software architecture may be employed.

Figure 14:
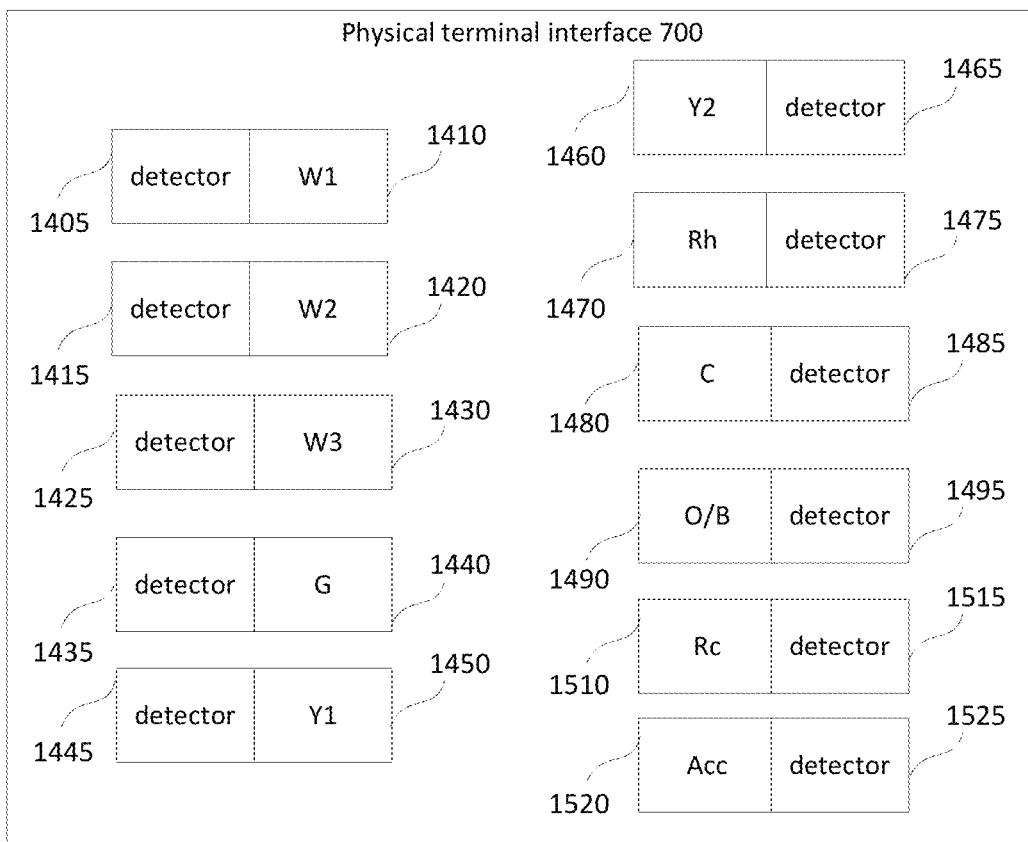
FIG. 14 illustrates a block diagram of an exemplary physical terminal interface in an environmental controller.

FIG. 14 illustrates a block diagram of an exemplary physical terminal interface 1400, which may, for example, be used as the physical terminal interface 670 shown in the environmental controller 600 of FIG. 13.

Physical terminal interface 1400 includes a plurality of physical connection terminals or ports for receiving wired connections to environmental appliances.

A W1 connection terminal 1410 is provided for receiving a connecting wire to first stage heating, or a primary heat source. This may be connected, for example, to an electric or gas furnace. There is also provided a detector 1405 coupled to the W1 connection port 1410. The detector 1405 can detect whether a wire is connected to the W1 connection port 1410 because it includes a mechanical detection pin, which if depressed shows a wire is connected to terminal 1410. The detector 1405 may be configured to send automatically a signal to the connection detecting module 640 when it first detects a wire has been inserted into the W1 terminal 1410. Alternatively, or additionally, the connection detection module 640 may poll the detector 1405 to request an indication of whether there is a connection to the connection terminal 1410. In some cases the connection detection module 640 polls the detector 1405 periodically, whilst in other cases the connection detection module 640 only polls the detection module 640 upon an indication that the user has initiated a setup or configuration process, upon the environmental controller 600 receiving one or more responses to user queries at the user interface module 630 and/or upon an expected connection configuration being determined or identified (as discussed in more detail above).

In other embodiments, detector 1405 may additionally or alternatively comprise an electrical detection sensor, such as a voltmeter or ammeter, for sensing whether an electrical connection has been made to the W1 connection terminal 1410. Information such as the voltage or current of a connection to the terminal 1410 may be sent to the connection detection module 640.

The physical terminal interface 1400 also includes a W2 connection terminal 1420 and a W3 connection terminal 1430 with corresponding connection detectors 1415, 1425. The detectors 1415, 1425 may work in the same way as described above for detector 1405. The W2 connection port 1420 is for connecting a second stage heating relay, such as for a supplementary heat source appliance to provide additional heat on top of the primary stage W1. Similarly, the W3 connection terminal 1430 is for connection to a third stage heating appliance for providing further additional heating.

A G connection terminal 1440 is provided in the physical terminal interface 1400 for connection to a fan for circulating air. G connection terminal 1440 is coupled to a connection detector 1435 of the type described above.

A Y1 connection terminal 1450 is provided for connection to a primary cooling appliance such as an air conditioning unit, along with a detector 1455 as described above for detecting connections to the Y1 connection terminal 1450.

A Y2 connection terminal 1460 is present for receiving connections to a secondary stage cooling appliance, which may provide additional/supplementary cooling. The Y2 connection terminal 1460 is similarly connected to a detector 1465 of the type described above.

An Rh connection terminal 1470 is provided for connection to switch power for the heat call. An Rc connection terminal 1510 is also provided for connection to power for cooling. Such connections may, for example, be at 24V AC. The Rh and Rc connection terminals 1470, 1510 also have corresponding detectors 1475, 1515, as described above.

A C connection terminal 1480 (also known as the common terminal) is provided for connecting to a power source for the environmental controller, for example a 24V AC mains supply. The C connection port 1480 also has a detector 1485.

The O/B connection terminal 1490 is for connecting to a heat pump for reversing the valve control (e.g. for switching the heat pump between cooling and heating modes). The O/B connection terminal 1490 is also coupled to a detector 1495, of the type described above. Normally the reversing valve is active when the heat pump is running in cooling mode, but in some instances it is activated for heating mode.

An Acc connection terminal 1520 is present for connection to a humidifier or dehumidifier. The Acc connection terminal 1520 is coupled to a detector 1525 for detecting whether there is a wire inserted into the terminal 1520. The detector 1525 may be as set out above in relation to detector 1405.

While a specific architecture is shown, any appropriate hardware/software architecture may be employed.

Whilst described mainly in the context of domestic HVAC systems, the invention may also be used in office environments or anywhere with temperatures or other environmental characteristics to be controlled.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A method of setting the operational configuration of an environmental controller arranged to control an environmental control system comprising one or more appliances for influencing one or more environmental parameters at a premises, the method comprising the steps of:
    displaying at least one user query from a series of user queries on a display of a user interface on the environmental controller;
    receiving, in response to the at least one user query, at least one user input at the user interface, the at least one user input relating to at least one of the one or more appliances intended to be controlled by the environmental controller;
    determining an expected connection configuration for a plurality of physical connection terminals on the environmental controller based on the at least one user input;
    following determining the expected connection configuration, detecting by the controller connections at the plurality of physical connection terminals; and
    validating the at least one user input by comparing the detected connections to the plurality of physical connection terminals with the expected connection configuration.

2. A method according to claim 1, further comprising the step of:
    upon determining a divergence between the detected connections to the plurality of physical connection terminals and the expected connection configuration, displaying an error message on the user interface.

3. A method according to claim 1, further comprising the step of:
    upon determining a divergence between the detected connections to the plurality of physical connection terminals and the expected connection configuration, disabling one or more control functions of the controller.

4. A method according to claim 1, further comprising the step of:
    upon determining that detected connections to the plurality of physical connection terminals match the expected connection configuration, configuring an environmental control setting of the environmental controller.

5. A method according to claim 1, wherein the at least one user input comprises an indication of the manner in which the environmental controller is arranged to influence one or more environmental parameters at the premises.

6. A method according to claim 1, wherein at least one of the series of user queries comprises a request for the user to specify the type of at least one of the one or more appliances.

7. A method according to claim 6, wherein the type of appliances are selected from the list comprising:
    a gas, propane and/or oil furnace;
    a boiler;
    an electric air handler;
    a heat pump;
    a dual fuel, hybrid and/or combined system;
    an air conditioning unit;
    a dehumidifier;
    a humidifier;
    a fan;
    a ventilation system;
    a whole dwelling ventilation system; and
    a space heating system.

8. A method according to claim 1, wherein detecting connections at the plurality of physical connection terminals is based on a component associated with the physical connection terminals arranged to sense physically whether there is a connection at each physical connection terminal.

9. A method according to claim 1, wherein detecting connections at the plurality of physical connection terminals is based on electrical sensing of whether there is a connection at each physical connection terminal.

10. A method according to claim 9, wherein the electrical sensing further comprises detecting a voltage or current at each physical connection terminal.

11. A method according to claim 10, wherein the step of validating the at least one user input further comprises comparing an expected voltage or current at each physical connection terminal with the detected voltage or current at each physical connection terminal, preferably wherein the expected voltage or current at each physical connection terminal is determined based on the determined expected connection configuration.

12. A non-transient, computer-readable medium comprising software code adapted, when executed on a data processing apparatus, to perform a method as set out in claim 1.

13. An environmental controller for controlling an environmental control system comprising one or more appliances for influencing one or more environmental parameters at a premises, the environmental controller comprising:
    a memory;
    a user interface for displaying information and queries to a user and for receiving user inputs;
    physical terminal interface comprising a plurality of physical connection terminals for receiving connections to appliances;
    a connection detection module for detecting connections at the plurality of physical connection terminals;
    a processor operable:
    to display on the user interface at least one user query from a series of user queries;
    to receive, in response to the at least one user query, at least one user input at the user interface, the at least one user input relating to at least one of the one or more appliances intended to be controlled by the environmental controller;
    to determine an expected connection configuration for a plurality of physical connection terminals on the environmental controller based on the at least one user input;
    following determining the expected connection configuration, to detect connections at the plurality of physical connection terminals; and
    to validate the at least one user input by comparing the detected connections to the plurality of physical connection terminals with the expected connection configuration.

14. An environmental controller according to claim 13, wherein the [physical connection terminals are each arranged to receive a control wire for an environmental control appliance and/or a wire from a power supply, and wherein the connection detection module is configured to detect connections at the plurality of physical connection terminals by detecting whether a control wire is received in each physical connection terminal.

15. An environmental controller according to claim 14, wherein the physical terminal interface comprises at least two physical connection terminals arranged to receive a control wire for an environmental control appliance, and wherein each of the at least two physical connection terminals are capable of providing control commands to a different set of one or more types of appliance.

16. An environmental controller according to claim 13, wherein the physical terminal interface comprises a plurality of mechanical detectors for detecting connections at the plurality of physical connection terminals.

17. An environmental controller according to claim 16, wherein the mechanical detectors each comprise a mechanical switch or pin for detecting a connection at the respective physical detection terminals.

18. An environmental controller according to claim 13, wherein the physical terminal interface comprises a plurality of electrical detectors for detecting electrical connections at the plurality of physical connection terminals.

19. An environmental controller according claim 18, wherein the electrical detectors are operable to detect a voltage and/or current at the physical connection terminals.

20. An environmental controller according to claim 13, wherein the user interface comprises a touchscreen display for displaying the series of queries and receiving the user inputs.

* * * * *